No. 751,695. PATENTED FEB. 9, 1904.
S. D. SMITHWICK.
FRUIT OR VEGETABLE CUTTER.
APPLICATION FILED SEPT. 3, 1902.
NO MODEL. 2 SHEETS—SHEET 1.
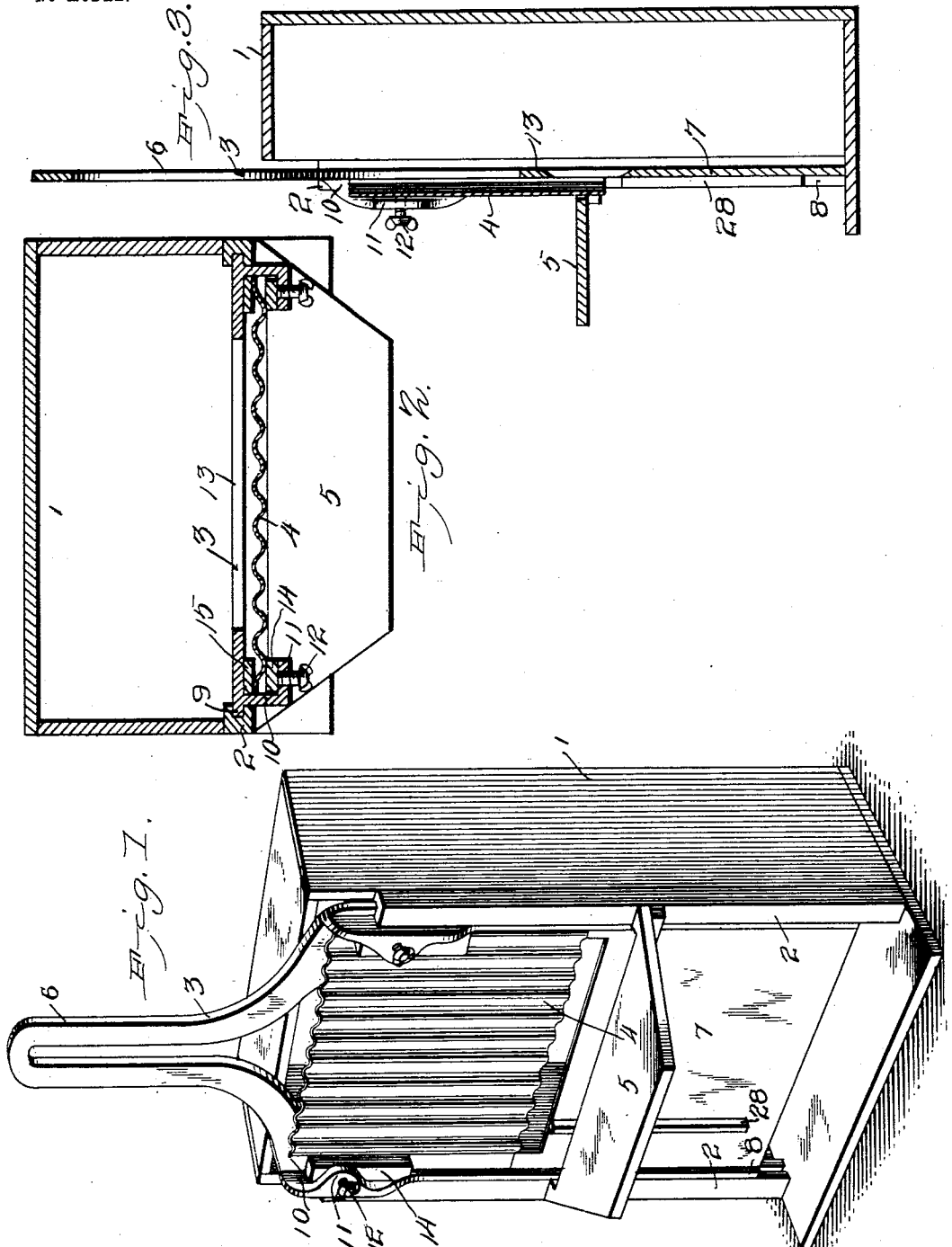
Witnesses
S. D. Smithwick, Inventor.
by C. A. Snow & Co.
Attorneys No. 751,695. PATENTED FEB. 9, 1904.
S. D. SMITHWICK.
FRUIT OR VEGETABLE CUTTER.
APPLICATION FILED SEPT. 3, 1902.
NO MODEL. 2 SHEETS—SHEET 2.
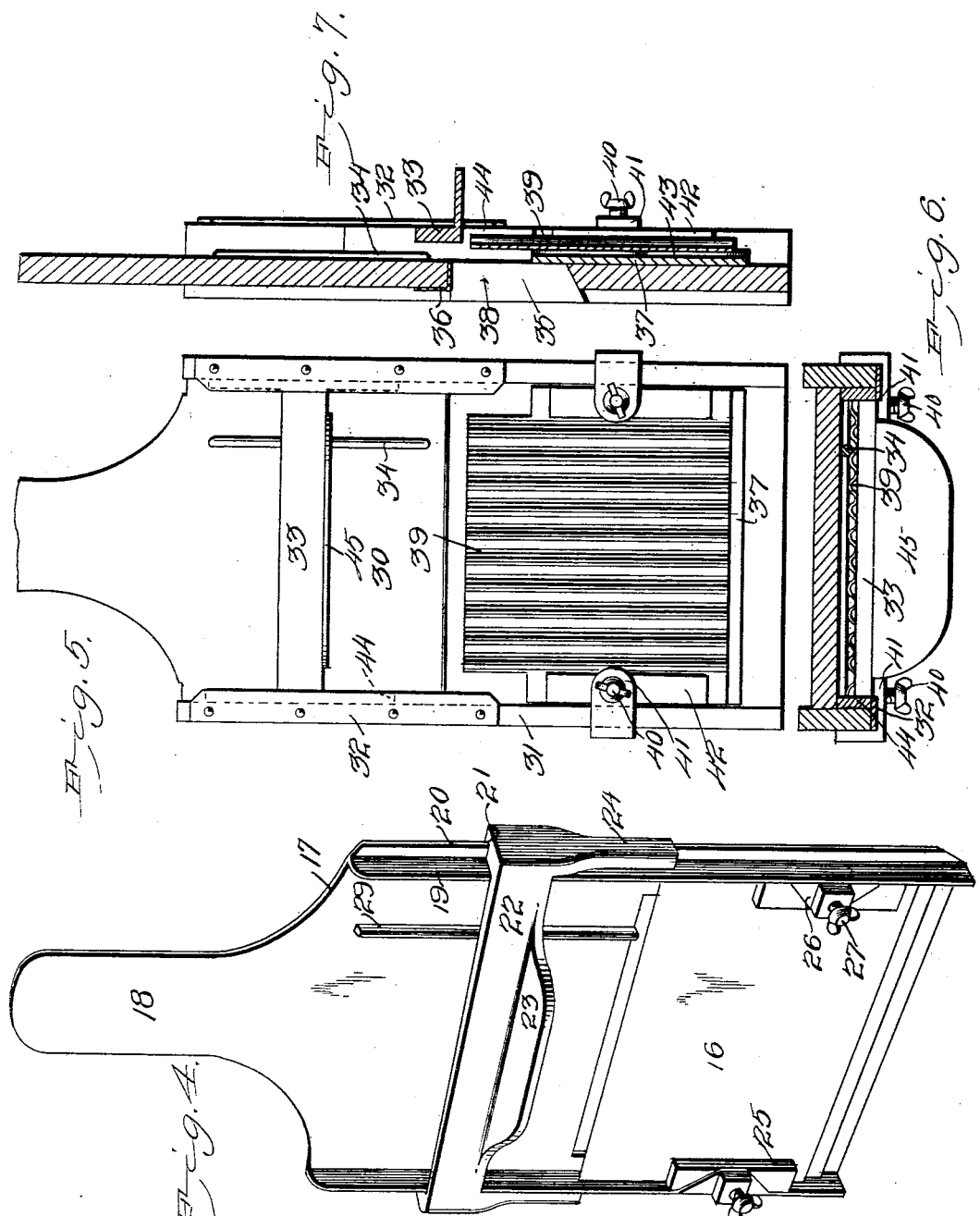

No. 751,695. Patented February 9, 1904.

UNITED STATES PATENT OFFICE.

SAMUEL DEWITT SMITHWICK, OF MANGUM, OKLAHOMA TERRITORY.

FRUIT OR VEGETABLE CUTTER.

SPECIFICATION forming part of Letters Patent No. 751,695, dated February 9, 1904.

Application filed September 3, 1902. Serial No. 122,005. (No model.)

*To all whom it may concern:*

Be it known that I, SAMUEL DEWITT SMITHWICK, a citizen of the United States, residing at Mangum, in the county of Greer, Oklahoma Territory, have invented a new and useful Fruit or Vegetable Cutter, of which the following is a specification.

The invention relates to improvements in fruit and vegetable cutters.

The object of the present invention is to improve the construction of fruit and vegetable cutters and to provide a simple and inexpensive construction of great strength and durability adapted for cutting fruit and vegetables into narrow strips or slices and capable of ready adjustment to vary the thickness of the strips or slices cut.

The invention consists in the construction and novel combination and arrangement of parts hereinafter fully described, illustrated in the accompanying drawings, and pointed out in the claim hereto appended.

In the drawings, Figure 1 is a perspective view of a fruit and vegetable slicer constructed in accordance with this invention. Fig. 2 is a transverse sectional view of the same. Fig. 3 is a longitudinal sectional view. Fig. 4 is a perspective view illustrating another form of the invention. Fig. 5 is an elevation of another form of the invention. Fig. 6 is a transverse sectional view of the same. Fig. 7 is a longitudinal sectional view.

Like numerals of reference designate corresponding parts in all the figures of the drawings.

1 designates a casing of approximately rectangular form open at the front and provided at opposite sides thereof with ways 2, receiving a reciprocating slide 3, which carries an adjustable knife 4. The ways 2 consist of grooves formed in projecting side portions of the casing, which is preferably constructed of suitable metal, and the slide is also preferably constructed of metal, so that there will be no liability of the parts warping when subjected to water; but the device may be constructed partly of wood and partly of metal, as hereinafter explained. The frame or casing is provided between its ends with a transverse support 5, consisting of a plate or shelf formed integral with the frame or casing and adapted to receive the material to be sliced or cut into strips and also forming a grip or handle, by means of which one member of the vegetable cutter is held while the knife is being reciprocated.

The slide 3, which is provided at its upper portion with a suitable handle 6, has a lower imperforate or solid portion 7, and it is provided at opposite sides with longitudinal ribs 8, spaced from the side edges 9 to provide projecting portions or tongues for engaging the grooves of the frame or casing. The upper portions of the ribs 8 are enlarged to form side flanges 10, which have inwardly-projecting ears 11, perforated and threaded for the reception of thumb-screws 12 for securing the knife 4 at the desired adjustment. The slide, which is open above the lower portion 7 to lighten the structure and to provide an escape for the material, is provided with a transverse bar or portion 13 for supporting the knife.

The knife may be corrugated, as illustrated in Fig. 1 of the drawings, or it may be straight, as shown in Fig. 4, and it is engaged by outer bearing blocks or members 14, and inner spacing blocks or members 15 are interposed between the knife and the slide to vary the thickness of the slice, and these blocks or pieces may be of any desired size to arrange the blade in the proper position. The thumb-screws are adapted to be readily adjusted to permit the blade to be detached or readjusted; but instead of employing clamping-screws any other form of fastening device may be employed. The material to be sliced is placed upon the transverse support or grip and the slide is reciprocated to carry the knife against the material. When the slide is drawn upward or backward, the material is placed against the lower or inner portion thereof, and as the knife is offset from the plane of the inner or lower portion of the slide a slice will be cut from the material, and by varying the distance between the plane of the knife and that of the lower or inner portion of the slide the thickness of the slice or strips severed by the cutter may be varied.

In Fig. 4 of the drawings is illustrated a modification of the invention, in which the knife 16 consists of a flat blade supported by a frame 17, constructed substantially the same as the slide of the vegetable and fruit slicer heretofore described. The frame 17 is provided with an upper handle 18, and it has longitudinal ribs or flanges 19 offset from the side edges to provide projecting tongues 20 to fit in grooves 21 of a slidable member 22. The slidable member 22 is provided with a transverse plate or portion 23, adapted to receive the material and forming a grip or handle by means of which the slidable element or member is held. The slidable member 22 is composed of a transverse portion and sides 24, which are provided with the said grooves 21, and the said slidable member is adapted to be reciprocated longitudinally of the frame or support to carry the material against the knife. The knife 16 is adjustable similar to that heretofore described, suitable bearing blocks or members 25 being arranged at the faces of the knife or blade to offset the same the desired distance from the upper solid or imperforate portion of the frame or support. The ribs or flanges 19 are provided with inwardly-extending perforated ears 26, having their perforations threaded for the reception of thumb-screws 27 for engaging the bearing blocks or members for holding the knife or blade. The vegetable and fruit cutter shown in Fig. 4 is preferably constructed of metal, and the slide 3 and the frame or support 17 may be stiffened by cleats 28 and 29, soldered or otherwise secured to the parts; but the parts may be constructed of cast metal, if desired.

In Figs. 5 to 7 of the drawings is illustrated another form of the invention, which is designed to be constructed of wood and metal. The frame 30, which is preferably constructed of wood, is provided with side bars or cleats 31, to which are secured inwardly-extending metallic strips or plates 32, forming ways for the reception of a slidable member 33. The frame, which is preferably supported at its upper portion by a metal cleat 34, is reinforced at the upper edge of the opening 35 by a metal plate 36, L-shaped in cross-section, as shown in Fig. 7. The lower portion of the frame is also provided with a reinforcing-board 37, having the grain disposed crosswise of the frame and at right angles to the grain at the body portion thereof. The frame is also provided at opposite sides of the opening 35 with blocks 38, which are secured to the side pieces 31.

The knife 39, which may be corrugated or straight, is adjustably secured by clamping-screws 40 or other suitable fastening devices, and the said clamping-screws are mounted in threaded perforations of ears 41, extending inward from the side flanges or pieces of the frame. The clamping-screws engage outer bearing blocks or members 42, and suitable metallic spacing blocks or members may be interposed between the knife and the board, as shown at 43 in Figs. 6 and 7, to vary the thickness of the slice. The blocks or strips 42 are adjustable and are adapted to be engaged by side pieces 44 of the slidable device 33, which is provided with a transverse plate or portion 45 for the reception of the material to be sliced or cut. The side pieces are adapted to engage the ends of the adjustable pieces 42 to prevent the slide 33 from coming in contact with the cutting edge of the knife.

The perforated ears 41 preferably consist of L-shaped plates secured to the sides of the frame and constructed of metal.

It will be seen that the vegetable slicers and cutters are exceedingly simple and inexpensive in construction, that they possess great strength and durability and will not become warped or broken, and that they are readily operated and are capable of enabling fruit and vegetables to be quickly sliced.

What I claim is—

In a device of the class described, the combination with a frame, of a vegetable-support fixed thereto, a slide slidably connected with the frame and having side flanges, inwardly-projecting ears carried by the side flanges, a knife disposed between the flanges beneath the ears, spacing members arranged between the knife and slide, bearing members disposed between the ears and knife, and set-screws extending through the ears and acting on the bearing members to clamp the knife.

In testimony that I claim the foregoing as my own I have hereto affixed my signature in the presence of two witnesses.

SAMUEL DEWITT SMITHWICK.

Witnesses:
 F. C. HOLMES,
 BELDEN SMITHWICK.